US012573903B2

(12) United States Patent
Nino Baron et al.

(10) Patent No.: US 12,573,903 B2
(45) Date of Patent: Mar. 10, 2026

(54) SWITCHED RELUCTANCE MOTOR MANUFACTURE WITH VARIABLE WIRE TWIST RATE

(71) Applicant: Caterpillar Inc., Peoria, IL (US)

(72) Inventors: Carlos E. Nino Baron, Edwards, IL (US); Yash Bharat Bhatia, Haryana (IN); Bradford Allyn Kough, Metamora, IL (US); Andrew A. Friebohle, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 17/947,309

(22) Filed: Sep. 19, 2022

(65) Prior Publication Data

US 2024/0097516 A1       Mar. 21, 2024

(51) Int. Cl.
| | |
|---|---|
| *H02K 3/18* | (2006.01) |
| *H02K 3/14* | (2006.01) |
| *H02K 15/026* | (2025.01) |

(52) U.S. Cl.
CPC ............. *H02K 3/14* (2013.01); *H02K 15/026* (2013.01); *H02K 2203/15* (2013.01)

(58) Field of Classification Search
CPC .. H02K 3/12; H02K 3/14; H02K 3/18; H02K 3/28; H02K 3/48; H02K 15/02; H02K 15/026; H02K 15/04; H02K 15/0442
See application file for complete search history.

(56) References Cited

U.S. PATENT DOCUMENTS

| | | | |
|---|---|---|---|
| 8,957,562 | B2 | 2/2015 | Kinpara et al. |
| 9,077,225 | B2 | 7/2015 | Chiba et al. |
| 9,118,225 | B2 | 8/2015 | Adra |
| 9,590,479 | B2 | 3/2017 | Tsuge et al. |
| 9,751,540 | B2 | 9/2017 | Cook |
| 10,163,551 | B2 | 12/2018 | Hirao et al. |
| 10,916,995 | B2 | 2/2021 | Gohs et al. |
| 2010/0026115 | A1 | 2/2010 | Kinjou et al. |
| 2014/0055000 | A1* | 2/2014 | Adra ........................ H02K 3/14 |
| | | | 310/213 |
| 2017/0155295 | A1* | 6/2017 | Adra ........................ H02K 3/18 |
| 2020/0336027 | A1 | 10/2020 | Takahashi |

FOREIGN PATENT DOCUMENTS

| | | |
|---|---|---|
| JP | 2002305849 A | 10/2002 |
| JP | 2002315247 A | 10/2002 |
| JP | 2010068616 A | 3/2010 |
| JP | 2012152028 A | 8/2012 |
| KR | 100919992 | 10/2009 |

OTHER PUBLICATIONS

Written Opinion and International Search Report for Int'l. Patent Appln. No. PCT/US2023/072207, mailed Nov. 27, 2023 (16 pgs).

* cited by examiner

*Primary Examiner* — Tran N Nguyen

(57) ABSTRACT

An assembly for an electric motor includes a stator including a plurality of stator poles, each stator pole including a base end and a rotor end opposite the base end, and an electromagnetic coil around each stator pole. The coil around each stator pole includes at least two electrically conductive wires wound into multiple wire turns around the stator pole that extend from the base end of the stator pole to the rotor end of the stator pole. Wire turns of the coil closer to the rotor end of the stator pole are twisted and wire turns of the coil closer to the base end of the stator pole are not twisted.

20 Claims, 8 Drawing Sheets

324

328                              332

326

330

334

236

236

Base End

230

Rotor End $B_{ext}$

740

742

800

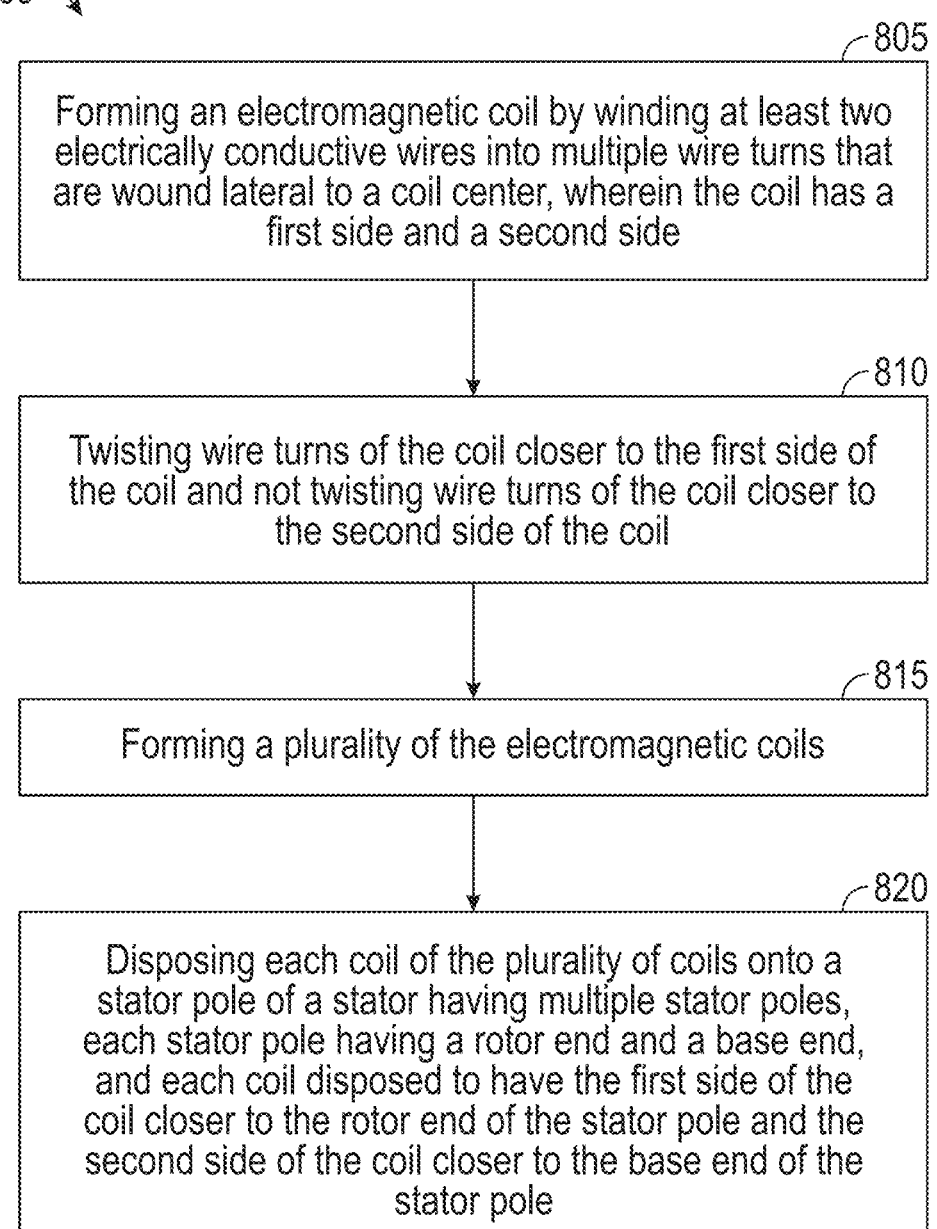

805

Forming an electromagnetic coil by winding at least two electrically conductive wires into multiple wire turns that are wound lateral to a coil center, wherein the coil has a first side and a second side

810

Twisting wire turns of the coil closer to the first side of the coil and not twisting wire turns of the coil closer to the second side of the coil

815

Forming a plurality of the electromagnetic coils

820

Disposing each coil of the plurality of coils onto a stator pole of a stator having multiple stator poles, each stator pole having a rotor end and a base end, and each coil disposed to have the first side of the coil closer to the rotor end of the stator pole and the second side of the coil closer to the base end of the stator pole

FIG. 8

SWITCHED RELUCTANCE MOTOR MANUFACTURE WITH VARIABLE WIRE TWIST RATE

TECHNICAL FIELD

This document relates to electric powered work machines and in particular to techniques to improve performance and manufacturability of the electric motors of electric work machines.

BACKGROUND

A large moving work machine (e.g., a wheel loader) can be powered with one or more electric motors. An example of an electric motor is described in U.S. Pat. No. 9,118,225. The electric motor is a switched reluctance motor that includes a stator that has electromagnetic coils. In operation, there are losses associated with the coils in the electric motor that undesirably produce heat. The wire turns of the coils are twisted to reduce these losses. However, there are challenges with manufacturing coils with twisted wire turns. Twisting the wires can cause the coils to misshape which can make it difficult to place the coils on stator.

SUMMARY OF THE INVENTION

Electric powered large moving work machines use large capacity energy sources to drive one or more electric motors. Twisting the wires of the coils of the electric motors improves performance of the motors, but the twisted coils are difficult to manufacture and electric motors are difficult to assemble with coils having twisted wire.

An example assembly for an electric motor for a work machine includes a stator including a plurality of stator poles, each stator pole including a base end and a rotor end opposite the base end, and an electromagnetic coil around each stator pole. The coil around each stator pole includes at least two electrically conductive wires wound into multiple turns around the stator pole that extend between the base end of the stator pole to the rotor end of the stator pole. Wire turns of the coil closer to the rotor end of the stator pole are twisted and wire turns of the coil closer to the base end of the stator pole are not twisted An example method of making an assembly for an electric motor includes forming an electromagnetic coil by winding at least two electrically conductive wires into multiple turns that are wound lateral to a coil center so that the coil has a first side and a second side, twisting wire turns of the coil closer to the first side of the coil and not twisting wire turns of the coil closer to the second side of the coil, forming multiple electromagnetic coils, and disposing each coil onto a stator pole of a stator having multiple stator poles. Each stator pole has a rotor end and a base end, and each coil disposed to have the first side of the coil closer to the rotor end of the stator pole and the second side of the coil closer to the base end of the stator pole.

An example electric motor of a work machine includes a stator, a rotor, and a plurality of electromagnetic coils. The stator includes a plurality of stator poles and a plurality of stator slots, each stator pole including a base end and a rotor end opposite the base end and each stator slot positioned between two stator poles. The rotor is positioned within the stator and includes a plurality of rotor poles extending toward the stator poles. Each of the electromagnetic coils is arranged around a stator pole and includes at least two electrically conductive wires wound into multiple wire turns around the stator pole that extend from the base end of the stator pole to the rotor end of the stator pole. The coil includes wire turns closer to the rotor end of the stator pole that are twisted and wire turns closer to the base end of the stator pole that are not twisted.

BRIEF DESCRIPTION OF THE DRAWINGS

FIG. 8 is a flow diagram of an example of a method of making an assembly for an electric motor in accordance with this disclosure.

DETAILED DESCRIPTION

Examples according to this disclosure are directed to methods and devices that improve efficiency of the electric motors of a work machine.

Figure 1:
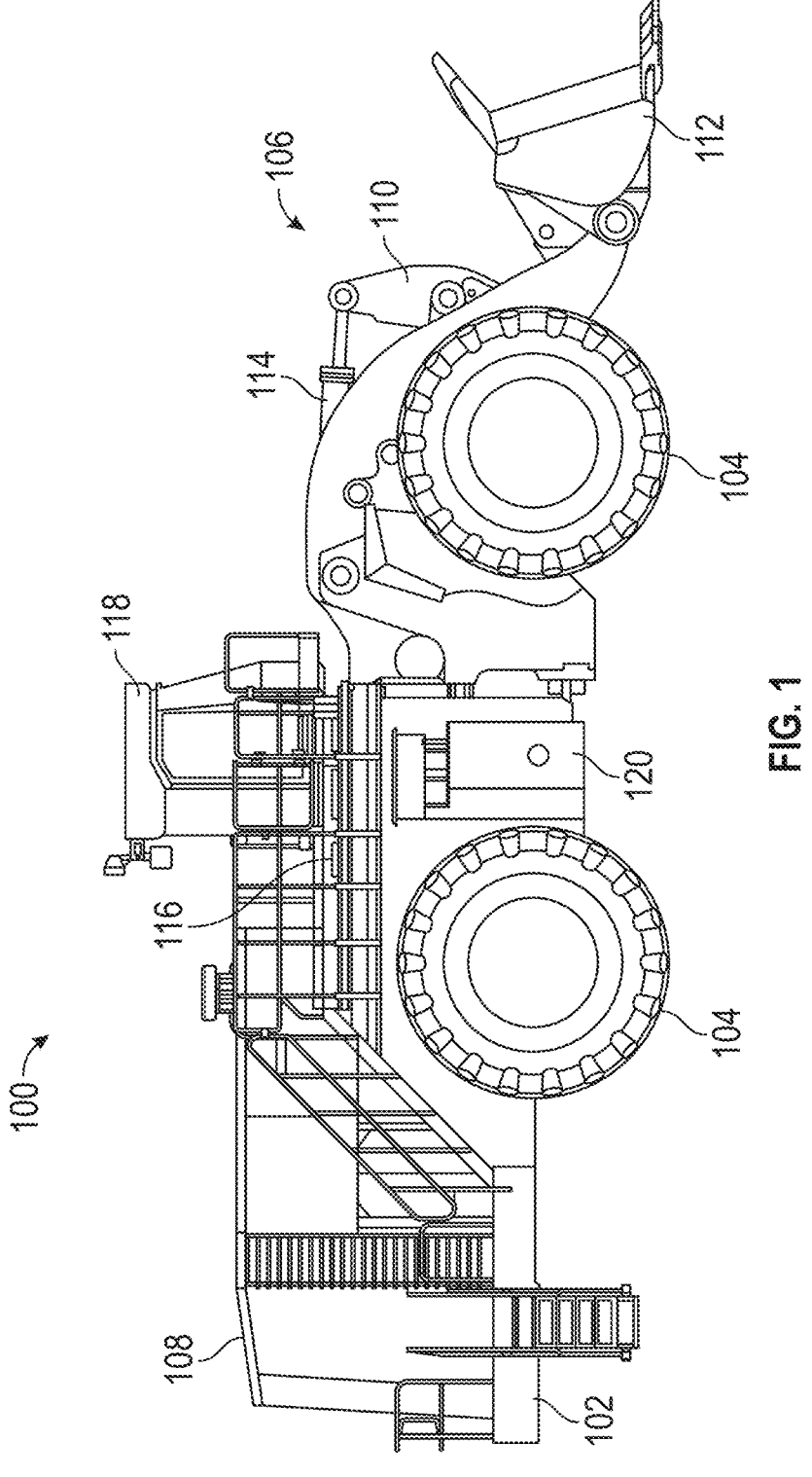
FIG. 1 is an elevation view depicting an example work machine in accordance with this disclosure.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, marine, stationary power, and so on. Accordingly, although some examples are described with reference to a wheel loader machine, examples according to this disclosure are also applicable to other types of machines including graders, scrapers, dozers, excavators, compactors, material haulers like dump trucks, marine vessels, gensets, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an electric motor to propel the machine over various terrain via wheels 104. In some examples, multiple electric motors are included in multiple enclosures at multiple locations of the machine 100.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 116. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. By further way of example, both operation by a remotely located operator and autonomous operation are contemplated. Machine 100 can be used to excavate a portion of a work site by actuating cylinders 114 to articulate bucket 112 via linkage 110 to dig into and remove dirt, rock, sand, etc. from a portion of the work site and deposit this load in another location. Machine 100 can include a battery compartment connected to frame 102 and including a battery system 120. Battery system 120 is electrically coupled to the one or more electric motors of the machine 100.

Figure 2:
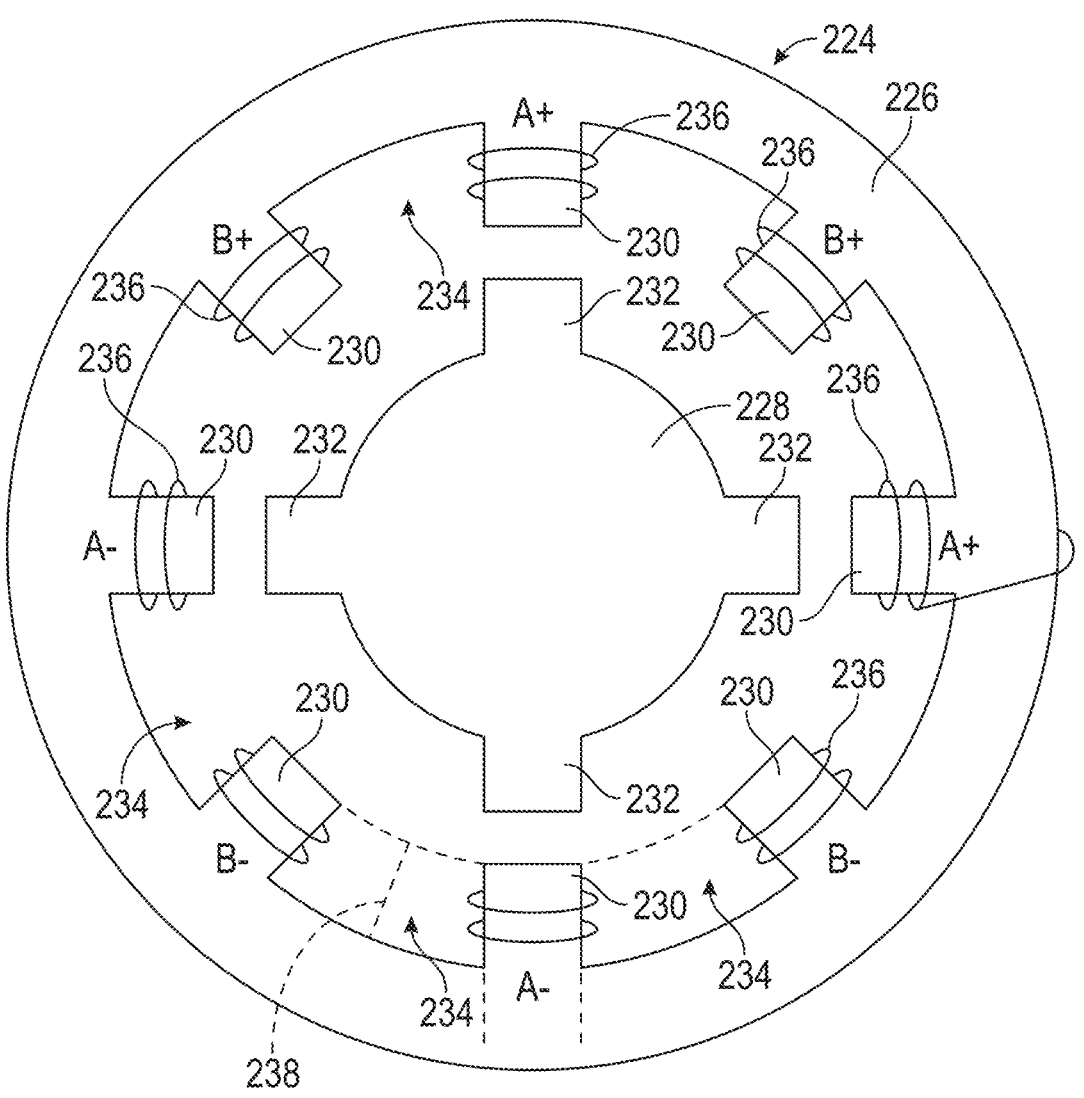
FIG. 2 is a schematic of portions of an example of an electric motor for a work machine in accordance with this disclosure.

FIG. 2 is a schematic of portions of an example of an electric motor 224 for a work machine, such as the work machine 100 of FIG. 1. The example electric motor 224 is a switched reluctance motor that includes a stator 226 and a rotor 228 rotatable relative to the stator 226. The stator 226 includes eight stator poles 230, and the rotor 228 includes four rotor poles 232. The electric motor 224 can include different numbers of stator poles 230 and rotor poles 232 than the example of FIG. 2.

The stator 226 includes stator slots 234 between the stator poles 230. The stator slots 234 open towards the rotor 228. The stator poles 230 and stator slots 234 have a base end and a rotor end. The stator slots 234 each have a width that tapers or narrows from the base end to the rotor end. The shape of the stator 226 may be referred to as an open slot configuration.

The stator poles 230 may be grouped into two or more phase sets of stator poles 230 that correspond to the number of phases (e.g., two phases) of the switched reluctance motor. In the example of FIG. 2, the eight stator poles 230 are grouped in two phase sets with four stator poles (labeled A+ and A−) grouped into one phase set and four stator poles (labeled B+ and B−) grouped into the other phase set. Each stator pole 230 has a conductive winding or electromagnetic coil 236 wrapped around it. The coils 236 positioned about the stator poles 230 of each group of a phase set (A+, A− and B+, B−) are electrically connected. Non-conductive spacers 238 can be placed in stator slots 234 between adjacent coils.

The rotor 228 has no windings or magnets. The rotor 228 may be formed as a stack of vertically laminated iron pieces. The rotor poles 232 may be grouped in diametrically aligned pairs.

In operation, rotation of the rotor 228 of the switched reluctance motor is achieved by the sequential excitation of adjacent sets of stator poles 230 by supplying current to the coils 236 of the stator poles 230. Excitation of the stator poles 230 creates magnetic flux towards which the rotor poles 232 are attracted which tends to align the rotor poles 232 with the energized stator poles 230. As the rotor poles 232 become aligned with the energized stator poles 230, the DC current to the energized poles is terminated and subsequently supplied to the next sequential stator poles 230. The rotor poles 232 are then attracted to the next set of sequential poles, which causes continued rotation of the rotor 228. This process is continued during operation of the switched reluctance motor. Torque is generated by the tendency of rotor poles 232 to align with energized stator poles 230. Continuous torque may be generated by synchronizing excitation of consecutive stator poles 230 with the instantaneous position of rotor poles 232. While the concepts are described in regard to a switched reluctance motor, the concepts can also be applied to a switched reluctance generator or any open slot electrical machine.

Figure 3:
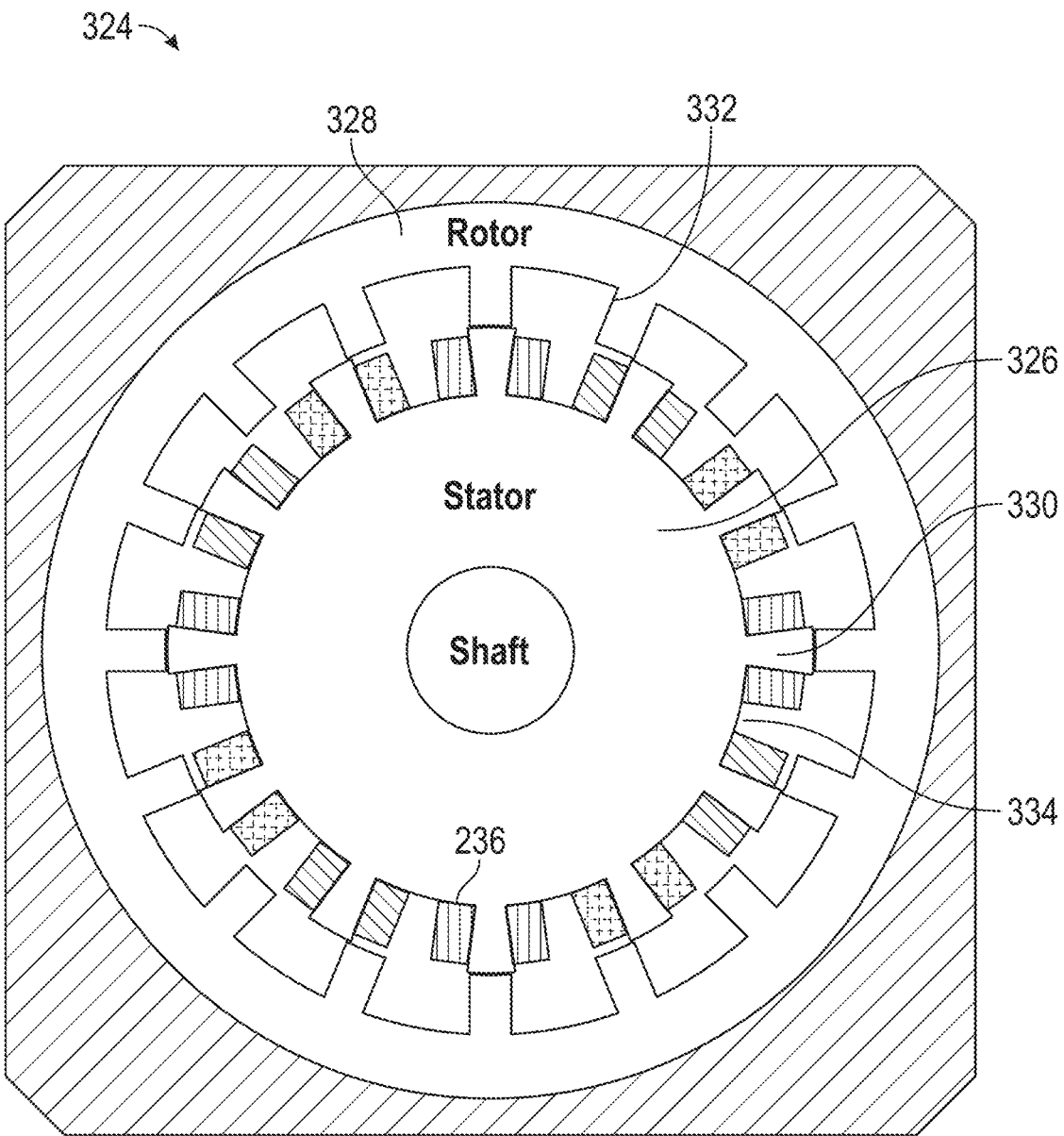
FIG. 3 is a schematic of portions of another example of an electric motor for a work machine in accordance with this disclosure.

FIG. 3 is another example of portions of an electric motor 324. The example electric motor 324 in FIG. 3 is also a switched reluctance motor that includes a stator 326 and a rotor 328. In this example, the stator 326 is within the rotor 328 and the surrounding rotor 328 rotates around the inner stator 326. Coils 236 are arranged around stator poles 330. The stator slots 334 have a different shape from the stator slots 234 of FIG. 2. In FIG. 3, the stator slots 334 each have a width that tapers or narrows from the rotor end to the base end. As in the example of FIG. 2, continuous torque may be generated by synchronizing excitation of consecutive stator poles 330 with the instantaneous position of rotor poles 332.

Figure 4:
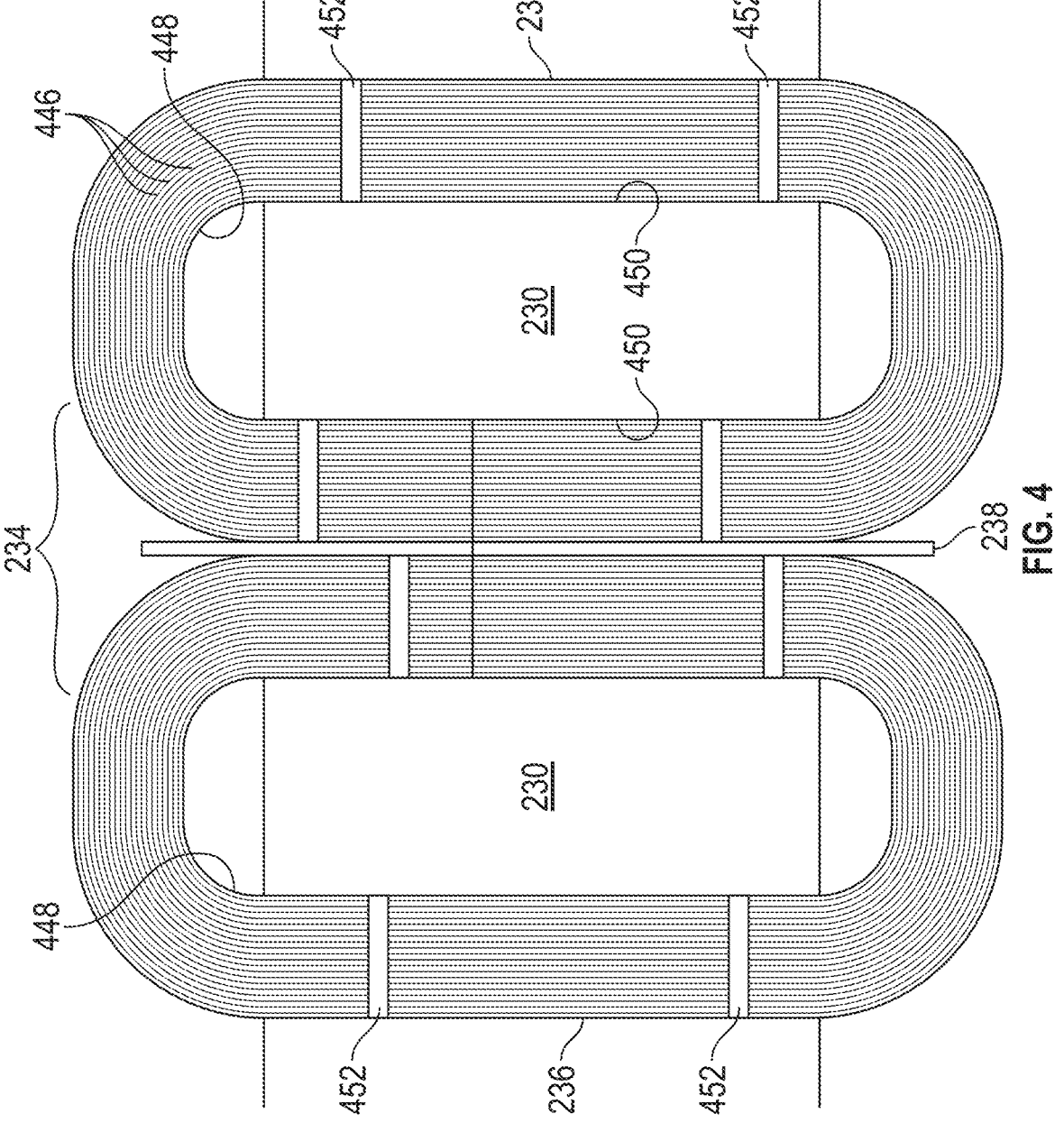
FIG. 4 is an end view of two stator poles and coils wound around the stator poles in accordance with this disclosure.

FIG. 4 shows an end view of two coils 236 arranged around adjacent stator poles 230. The stator poles 230 can be included in either of the stators of FIG. 2 or FIG. 3. The coils 236 include at least two conductive wires wound into multiple wire turns 446 wound with coil innermost portion 448. The coil innermost portion 448 contacts the side surfaces 450 of the stator pole 230. Non-conductive tape 452 may be used to hold the wire turns of the coil. The coils 236 are positioned in a stator slot 234 between the stator poles 230. A non-conductive spacer 238 may be placed in the stator slot 234 between the adjacent coils 236.

Figure 5:
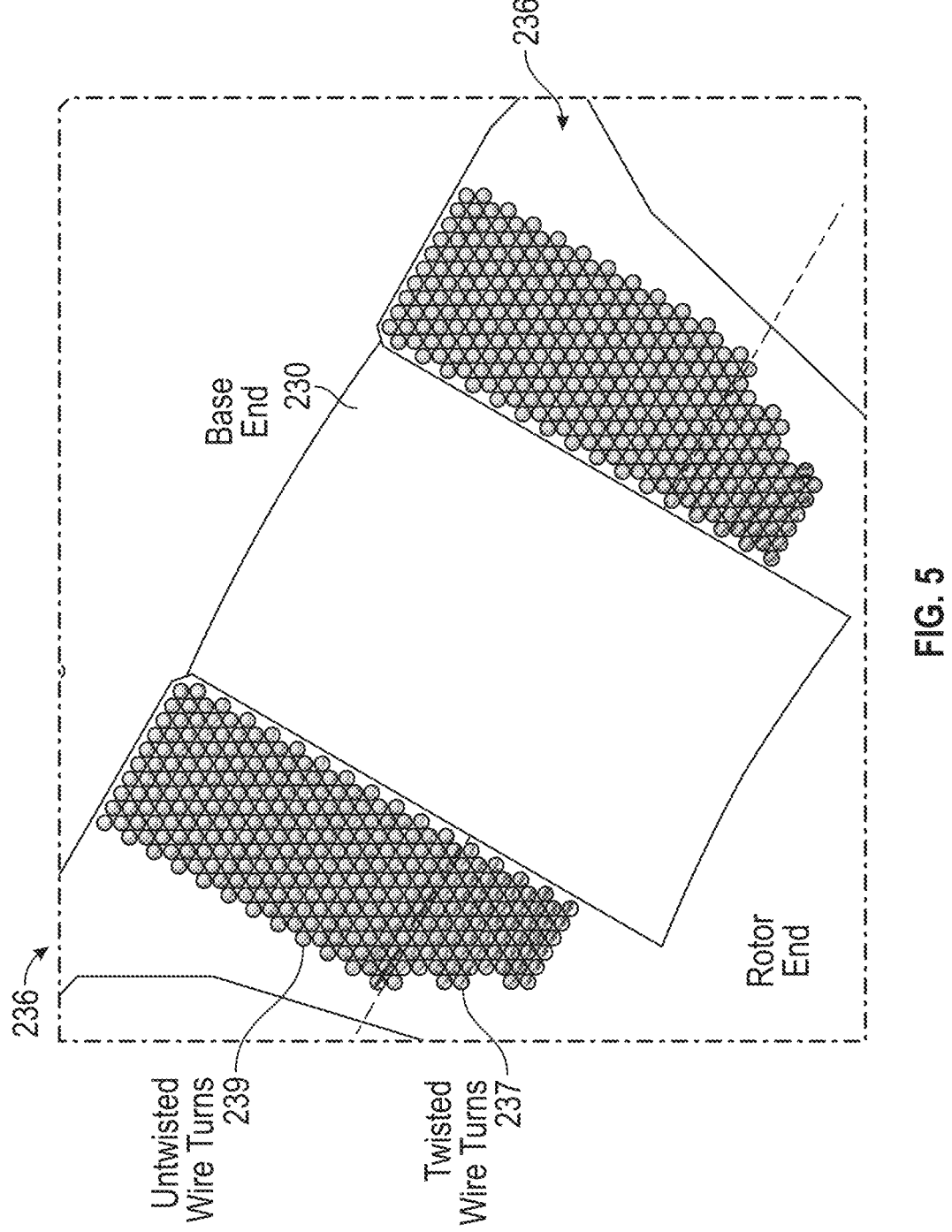
FIG. 5 is a cross section view of a stator pole and a coil wound around the stator pole such as the stator pole shown in FIG. 2 as pole B+, in accordance with this disclosure.

FIG. 5 is a cross section view of a stator pole 230, such as the stator pole designated B+ in FIG. 2, and a coil 236 wound around the stator pole 230. In this example, the rotor is positioned within the stator. The coil 236 includes at least two electrically conductive wires wound into multiple wire turns around the stator pole 230. The wire turns of the coil 236 extend from the base end of the stator pole 230 to the rotor end of the stator pole 230. Each stator slot 234 holds a portion of the coil 236 of a stator pole 230 and a portion of the coil 236 of the neighboring stator pole 230. The coils 236 have a number of lengthwise wire turns per length of the stator pole 230. Because the stator slots 234 are tapered, the coils 236 have less wire turns per length at the rotor end of the stator pole 230 than at the base end of the stator pole 230. The wire turns of the coil 236 closer to the rotor end of the stator pole are twisted and wire turns of the coil 236 closer to the base end of the stator pole 230 are not twisted. The coil shape is reversed for the stator 326 of the electric motor 324 of FIG. 3 because the coil slot 334 is reversed with the coils 236 having less wire turns per length at the base end of the stator pole 330 than at the rotor end of the stator pole 330.

Twisting the wire of the coil improves efficiency and reduce losses that generate heat. However, twisting all wire turns of the coil 236 results in a larger coil as adjacent twisted wires may not lie together as compactly. This can cause the coil to be bowed instead of flat. During a conduction cycle when the coil is energized, the maximum flux in the coil is near the gap between the stator pole 230 and the rotor pole 232. Twisting only the wire in the coil nearer to the rotor end provides the efficiency improvement and results in a coil that is easier to manufacture and dispose in the stator 226.

FIG. 5 shows portions of the coil 236 that include twisted wire turns 237 and untwisted wire turns 239. In the example of FIG. 5, less than half of the wire turns are twisted. In some examples, substantially half of the wire turns (e.g., 40-60% of the wire turns) are twisted.

Figure 6:
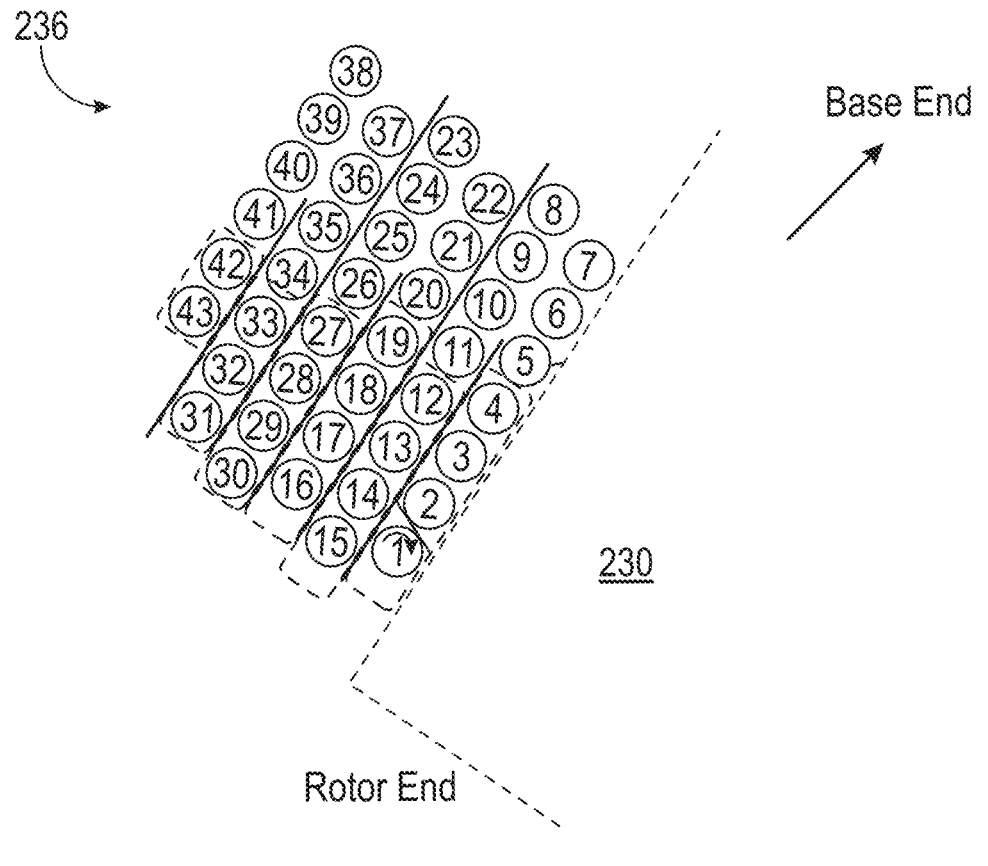
FIG. 6 is a cross section view of the wire turns of a coil and FIGS. 9A-9D illustrate a wire turn of a coil in accordance with this disclosure.

FIG. 6 is a cross section view of some of the wire turns of the coil 236. The wire turns within the rectangles are closer to the rotor end and are twisted. Those wire turns not in rectangles are not twisted. The numerals within the circles reflect the order that wire turns are formed when winding the coils. FIG. 6 shows that the twisting of the wire may not be performed sequentially on the wire turns. Instead, the twisting of the wire may stop and start and various times in the winding of the coils 236.

Figure 9A:
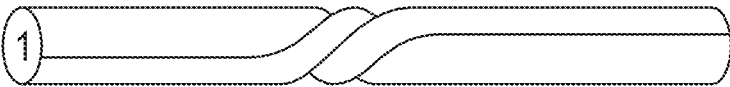
Figure 9B:
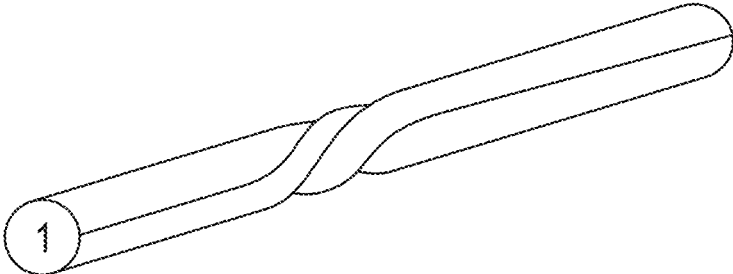
Figure 9C:
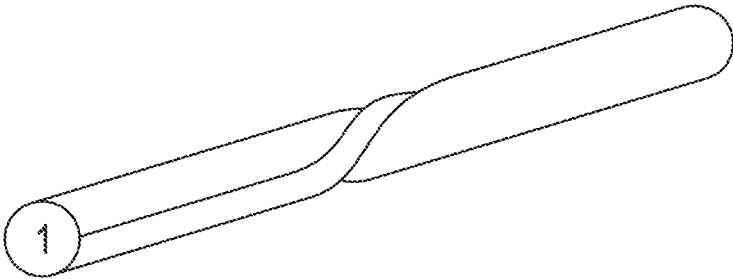
Figure 9D:
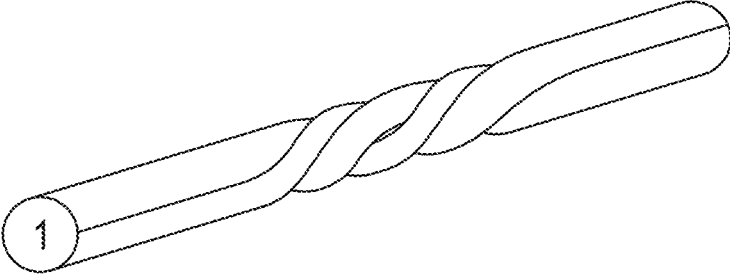

The wires closer to the rotor end may have one twist per turn and the wires closer to the base end have zero twists per turn. FIGS. 9A-9D illustrate a twist in one wire turn of wire turns of the coil as in FIG. 6. The number of twists per turn may be different than one twist per turn. The number of twists per turn may be, but not restricted to, in a one-half twist per wire turn of the coil (as shown in FIG. 9C) to two twists per wire turn of the coil (as shown in FIG. 9D), but the wires closer to the base end still have zero twists per wire turn of the coil.

Figure 7:
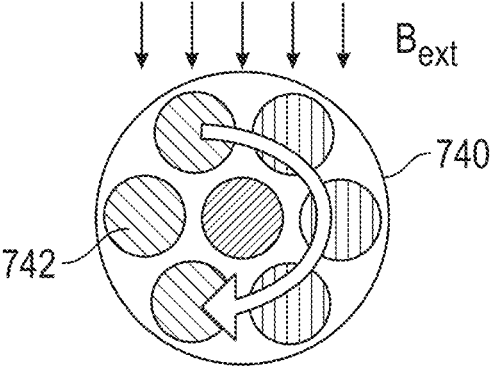
FIG. 7 is a cross section view of an electrically conductive wire group that can be wound to make electromagnetic coils for an electric motor in accordance with this disclosure.

FIG. 7 is a cross section view of the electrically conductive wire that can be wound to make the coils 236. The wire may be electrically insulated wire that can include insulation 740 and a conductive wire. The conductive wire may include multiple metal wire strands 742 within the insulation 740. In this example, seven strands of wire are within the insulation 740.

INDUSTRIAL APPLICABILITY

FIG. 8 is a flow diagram of an example of a method 800 of making an assembly for an electric motor. At block 805, an electromagnetic coil is formed by winding at least two electrically conductive wires into multiple wire turns that are wound with an orientation lateral to a coil center. The coil is formed to have a first side and a second side. The wire may be an electrically insulated wire including insulation having multiple metal wire strands within the insulation.

At block 810, less than all the wire of the turns are twisted. The wire turns of the coil closer to the first side of the coil are twisted, and the wire turns of the coil closer to the second side of the coil are not twisted. In some examples, substantially half the wire turns (e.g., the top half of the turns) include a twist in the wire. In variations less than half the turns include a twist in the wire. In some examples, twisting the wire of a wire turn includes twisting the wire once per turn. In some examples, twisting the wire includes twisting the wire turns to have a number of twists per turn that is in a range of, but not restricted to, one-half twist per turn to two twists per turn.

At block 815, a plurality of such coils is formed. At block 820, each of the coils is disposed on a stator pole of a stator that has multiple stator poles. Each stator pole has a rotor and a base end. Each coil is disposed to have the first side of the coil closer to the rotor end of the stator pole and the second side of the coil closer to the base end of the stator pole. The coils may be disposed in stator slots next to the stator poles. The stator slots may be tapered and narrower at the rotor end and wider at the base end. The coils may have less wire turns on the first side of the coil than the second side of the coil to accommodate the change in width. Conversely, the stator slots may be tapered and wider at the rotor end and narrower at the base end. The coils may have more wire turns on the first side of the coil than the second side of the coil to accommodate the change in width. Non-conductive spacers may be disposed in the stator slots between adjacent coils.

A coil with less than all the wire turns of the coil twisted reduces coil leg thickness and coil leg height as compared to twisting all the wire turns of the coil, which makes the manufacturing of the coils easier but still provides the benefits of a coil with twisted wire. It also improves the shape of the coil by preventing torsional twist of the coil, which makes it easier to place the coils on the stator poles and eliminates the need to cold-press the coils into an improved shape for placement. A coil with less than all the wire turns of the coil twisted reduces the strand-to-strand contact stress and reduces wire cross over, thereby improving working life of the coil as compared to a coil with all wire turns twisted. It also reduces coil resistance improves the coil contact area which improves cooling of the coils. While the concepts are described in regard to electric motors, the concepts can also be applied to generators.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. An assembly for an electric motor, the assembly comprising:
    a stator including a plurality of stator poles, wherein a stator pole includes a length extending from a base end of the stator to a rotor end of the stator opposite the base end; and
    an electromagnetic coil around each stator pole, the coil around each stator pole including:

at least two electrically conductive wires wound into multiple wire turns around the stator pole that extend between the base end of the stator pole to the rotor end of the stator pole;

wherein wires of wire turns of the coil closer to the rotor end of the stator pole are each separately twisted to individually include at least one half twist per wire turn of the wire, and wires of wire turns of the coil closer to the base end of the stator pole are not twisted; and wherein the coil includes multiple twisted wire turns per length of the stator and the number of multiple twisted wire turns per length decreases along the stator length from the base end of the stator pole to the rotor end of the stator pole to taper the number of twisted wire turns at the rotor end.

2. The assembly of claim 1, wherein the wires of wire turns of the coil closer to the rotor end of the stator pole include one twist per turn and the wires of wire turns of the coil closer to the base end of the stator pole include zero twists per turn.

3. The assembly of claim 1, wherein turns of the wires of the coil closer to the rotor end of the stator pole include a number of twists per turn that is in a range of one-half twist per turn to two twists per turn, and turns of the wires of the coil closer to the base end of the stator pole include zero twists per turn.

4. The assembly of claim 1, wherein substantially half of the turns of the wires are twisted.

5. The assembly of claim 1, wherein less than half of the turns of the wires are twisted.

6. The assembly of claim 1, wherein the at least two electrically conductive wires are electrically insulated wires including insulation and multiple metal wire strands within the insulation.

7. The assembly of claim 1, wherein the coil has less wire turns per length at the rotor end of the stator pole than at the base end of the stator pole.

8. A method of making an assembly for an electric motor, the method comprising:

forming an electromagnetic coil by winding at least two electrically conductive wires into multiple wire turns that are wound lateral to a coil center, wherein the coil has a first side, a second side, a coil axis orthogonal to the coil center, and multiple wire turns per length of the coil axis;

individually twisting the wires of wire turns of the coil located closer to the first side of the coil to include at least one-half twist per wire turn in each wire and not twisting the wires of wire turns of the coil located closer to the second side of the coil, and decreasing the number of twisted wire turns per length of the coil axis from the second side to the first side;

forming a plurality of the electromagnetic coils; and disposing each coil of the plurality of coils onto a stator pole of a stator having multiple stator poles, each stator pole having a rotor end and a base end, and each coil disposed to have the first side of the coil closer to the rotor end of the stator pole and the second side of the coil closer to the base end of the stator pole.

9. The method of claim 8, wherein twisting the wires of wire turns closer to the first side of the coil includes individually twisting the wires of wire turns once per wire turn.

10. The method of claim 8, wherein twisting the wires of wire turns closer to the first side of the coil includes twisting the wires of wire turns to have a number of twists per turn that is in a range of one-half twist per turn to two twists per turn.

11. The method of claim 8, wherein twisting the wires of wire turns closer to the first side of the coil includes twisting substantially the wires of half of the wire turns nearer to the first side and not twisting substantially the wires of half of the wire turns nearer to the second side.

12. The method of claim 8, wherein twisting the wires of wire turns closer to the first side of the coil includes twisting the wires of less than half of the total wire turns of the coil.

13. The method of claim 8, wherein winding the at least two electrically conductive wires into multiple wire turns includes winding at least two electrically conductive wires that are electrically insulated wires including insulation having multiple metal wire strands within the insulation.

14. The method of claim 8, wherein winding the at least two electrically conductive wires into multiple wire turns includes winding the wires of more wire turns on the second side of the coil than on the first side of the coil.

15. The method of claim 8, including placing wire turns into stator slots between stator poles and disposing non-conductive spacers in stator slots between adjacent coils.

16. An electric motor of a work machine, the electric motor comprising:

a stator including a plurality of stator poles and a plurality of stator slots, each stator pole including a base end and a rotor end opposite the base end and each stator slot positioned between two stator poles;

a rotor positioned with in the stator and including a plurality of rotor poles extending toward the stator poles; and a plurality of electromagnetic coils, each coil arranged around a stator pole and including:

at least two electrically conductive wires wound into multiple wire turns of a coil arranged around the stator pole that extend from the base end of the stator pole to the rotor end of the stator pole, wherein the multiple wire turns of the coil include wire turns closer to the rotor end of the stator pole with wires that are each individually twisted to include at least one half twist per wire turn of the wire, and wires of wire turns closer to the base end of the stator pole are not twisted, and wherein the coil includes multiple twisted wire turns per length of the stator and the number of twisted wire turns per length decreases along the stator length from the base end of the stator pole to the rotor end of the stator pole to taper the number of twisted wire turns at the rotor end.

17. The electric motor of claim 16, wherein the wires of wire turns closer to the rotor end of the stator poles include one twist per turn and the wires of wire turns closer to the base end of the stator poles include zero twists per turn.

18. The electric motor of claim 16, wherein the wire turns closer to the rotor end of the stator poles include a number of twists per turn that is in a range of one-half twist per turn to two twists per turn, and the wire turns closer to the base end of the stator poles include zero twists per turn.

19. The electric motor of claim 16, wherein the stator slots are tapered and are wider at the base end of the stator poles than at the rotor end of the stator poles and the coils are arranged within the stator slots; and wherein each of the coils have less twisted wire turns per length at the rotor end of the stator poles than untwisted wire turns per length at the base end of the stator poles.

20. The electric motor of claim 16, wherein the at least two electrically conductive wires are electrically insulated wires including insulation and multiple metal wire strands within the insulation.

* * * * *